(12) United States Patent
Yang et al.

(10) Patent No.: US 12,052,219 B2
(45) Date of Patent: Jul. 30, 2024

(54) CHASSIS SYSTEM MANAGEMENT THROUGH DATA PATHS

(71) Applicant: Fortinet, Inc., Sunnyvale, CA (US)

(72) Inventors: Sen Yang, San Jose, CA (US); Zicheng Wang, Santa Clara, CA (US); Ting Liu, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 217 days.

(21) Appl. No.: 17/855,668

(22) Filed: Jun. 30, 2022

(65) Prior Publication Data

US 2024/0007435 A1    Jan. 4, 2024

(51) Int. Cl.
*H04L 9/40* (2022.01)
*H04L 47/32* (2022.01)

(52) U.S. Cl.
CPC .......... *H04L 63/0218* (2013.01); *H04L 47/32* (2013.01); *H04L 63/0236* (2013.01)

(58) Field of Classification Search
CPC .. H04L 63/0218; H04L 63/0236; H04L 47/32
USPC .......................................................... 726/12
See application file for complete search history.

(56) References Cited

U.S. PATENT DOCUMENTS

| | | | | |
|---|---|---|---|---|
| 7,797,411 B1* | 9/2010 | Guruswamy | ......... | G06F 15/173 709/229 |
| 8,266,267 B1* | 9/2012 | Guruswamy | ......... | G06F 15/173 709/229 |
| 10,733,119 B2* | 8/2020 | Yun | ......... | G11C 29/00 |
| 2011/0072452 A1* | 3/2011 | Shimy | ......... | H04N 21/44218 725/25 |
| 2012/0084438 A1* | 4/2012 | Raleigh | ......... | H04L 63/1425 709/224 |
| 2018/0183832 A1* | 6/2018 | Chang | ......... | H04L 63/0428 |
| 2019/0132739 A1* | 5/2019 | Raleigh | ......... | H04W 12/12 |
| 2020/0404069 A1* | 12/2020 | Li | ......... | H04L 67/59 |
| 2023/0006918 A1* | 1/2023 | Gorajala Chandra | .. | H04L 45/02 |
| 2023/0006967 A1* | 1/2023 | Neeli | ......... | H04W 12/088 |

(Continued)

OTHER PUBLICATIONS

T. Brey; BladeCenter chassis management; IEEE; Year;2005; pp. 941-960.*

*Primary Examiner* — Monjur Rahim
(74) *Attorney, Agent, or Firm* — Law Office of Dorian Cartwright; Dorian Cartwright

(57) ABSTRACT

A firewall processing card from a plurality of firewall processing cards coupled to a chassis, is selected by a load balancing engine (or other mechanism) and receives the data packet over the fabric channel. First, if the session match exists to management-type data packets the data packet is returned to the I/O board and if a match exists to user data packets the data packet is sent to a firewall service of the firewall processing card. If no session match exists, the firewall processing card checks for a policy match to the data packet for creating a new session or drops the data packet. The I/O board receives the data packet returned from the processing blade over the base channel and checks for a session matching to the data packet. If a session match exists and the data packet is a management data packet, the data packet is sent to a management service at a user level of the I/O board and if not a management data packet the data packet is dropped. If no session match exists, the I/O board creates a new session or drops the data packet.

6 Claims, 9 Drawing Sheets

(56) References Cited

U.S. PATENT DOCUMENTS

| | | | |
|---|---|---|---|
| 2023/0097005 A1* | 3/2023 | Castro da Rosa | H04L 63/0245 |
| | | | 726/1 |
| 2023/0101920 A1* | 3/2023 | Xiao | H04L 63/0281 |
| | | | 713/168 |
| 2023/0319111 A1* | 10/2023 | Lee | H04L 63/0236 |
| | | | 726/1 |
| 2023/0319633 A1* | 10/2023 | Sridhar | H04L 12/4633 |
| | | | 370/229 |
| 2023/0400838 A1* | 12/2023 | Diaz | G05B 19/4183 |

* cited by examiner

CHASSIS SYSTEM MANAGEMENT THROUGH DATA PATHS

FIELD OF THE INVENTION

The invention relates generally to computer networking, and more specifically, for managing a group of firewall processing blades, communicatively connected over a chassis on a network device, through data paths.

BACKGROUND

Virtual Private Networking (VPN) is one network application for communication between two stations that relies upon the security of IPsec tunnels. In a gateway device, all data packets can be subject to security policies of a private network. This is accomplished by hashing certain headers from data packets for identification, such as a 5 tuple for a data packet (e.g., protocol type, source IP, source port, destination IP, and destination port).

Due to IPsec encryption, it is not currently possible to hash the 5 tuple and thus not possible to identify inbound data packets for applying a security policy by the same member to the same peer gateway. In the IPsec packet sending process, a data packet sent from a station is wrapped with an Encapsulating Security Payload (ESP) header, thereby concealing at least portions of the 5 tuples. Consequently, consecutive session packets may match the same security policy in Security Policy Database (SPDB) but be processed and transmitted by different members to the same peer gateway.

Another problem is synchronizing an Internet Key Exchange (IKE) exchange that is necessary for configuring an IPsec tunnel for operation, across independent members. The same Security Associations (SAs), both IKE and IPsec, are not currently available across different members. All members cannot independently send request and respond as the peer will be confusing. On the other hand, all IPsec traffic processed on a single member, multi-member resource is waste.

Although some of these problems were solved by [app no.], there still exists issues in management of the underlying chassis system. For example, there are different types of packets that are processed by different components. No technique currently exists for distributing management data frames versus user data frames. Whereas the management data frames may need to be sent to a firewall service on a firewall processing blade, the management frames may need to be sent to a management service on a management blade.

Therefore, what is needed is a robust technique for managing a group of firewall processing blades, communicatively connected over a chassis on a network device, through data paths.

SUMMARY

These shortcomings are addressed by the present disclosure of methods, computer program products, and systems for managing a group of firewall processing blades, communicatively connected over a chassis on a network device, through data paths.

In one embodiment, an I/O board has a user interface and a load balancing engine, and is coupled to a base channel on a chassis internal switch for chassis management. The I/O board is also coupled to a fabric channel on a chassis internal switch for user data traffic, to receive a data packet from the user interface. A plurality of firewall processing blades have a local processor, and each firewall processing card can be coupled to the base channel and coupled to the fabric channel. The load balancing engine (or other selector) selects a firewall processing blade to send the data packet over the fabric channel.

In another embodiment, the firewall processing card is selected by the load balancing engine and receives the data packet over the fabric channel. First, session data is matched to the data packet, if the session match exists to management-type data packets the data packet is returned to the I/O board and if a match exists to user data packets the data packet is sent to a firewall service of the firewall processing card, and if no session match exists, the firewall processing card checks for a policy match to the data packet for creating a new session, and if no policy match exists, drops the data packet.

In still another embodiment, the I/O board receives the data packet returned from the processing blade over the base channel and checks for a session matching to the data packet. If a session match exists and the data packet is a management data packet, the data packet is sent to a management service at a user level of the I/O board and if not a management data packet the data packet is dropped. If no session match exists, the I/O board checks for a policy match to the data packet for creating a new session, and if no policy match exists, drops the data packet. Many other variations are possible.

Advantageously, a computer device performance is improved with higher throughput of network traffic. Likewise, network performance is improved for the same reason.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for managing a group of firewall processing blades, communicatively connected over a chassis on a network device, through data paths.

One of ordinary skill in the art will recognize many additional variations made possible by the succinct description of techniques below.

I. Systems for Managing Firewall Processing Blades (FIGS. 1-3E)

Figure 1:
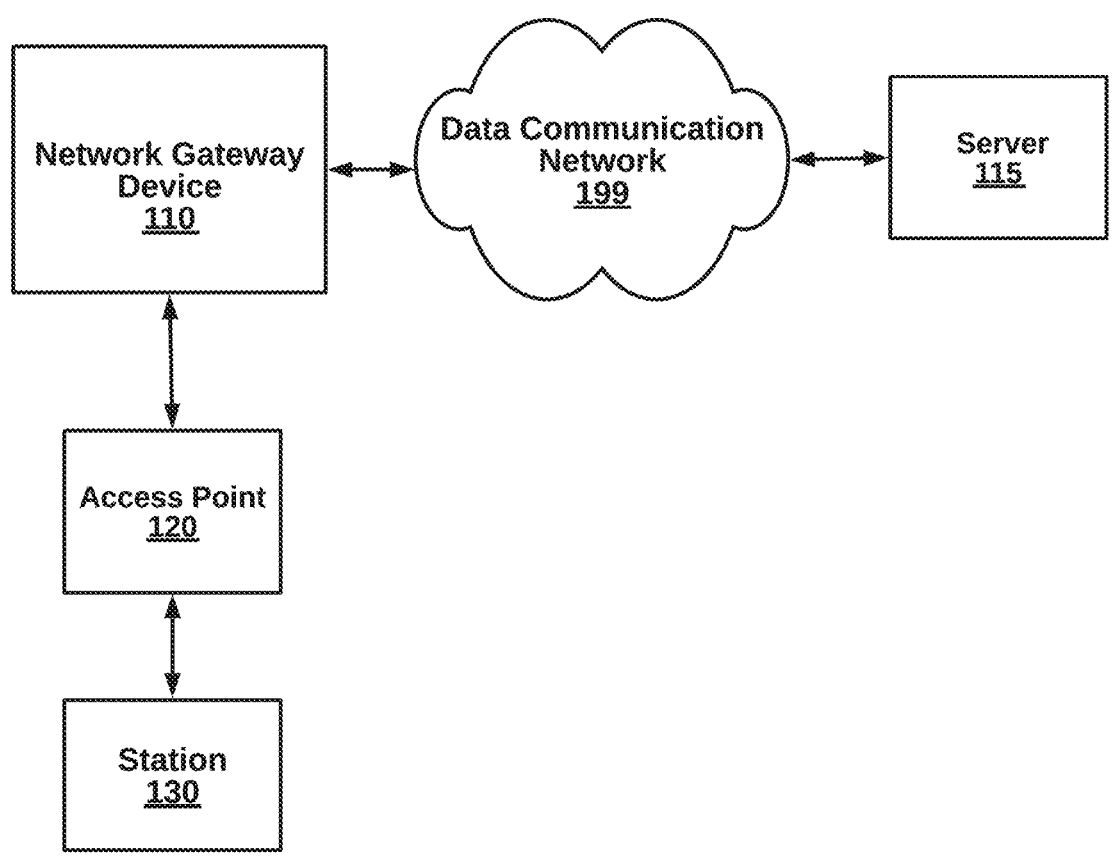
FIG. 1 is a block diagram illustrating a system for managing a group of firewall processing blades with an I/O board, communicatively connected over a chassis on a network device, through data paths, according to an embodiment.

FIG. 1 is a block diagram illustrating a system 100 for managing a group of firewall processing blades, communicatively connected over a chassis on a network device, through data paths, according to an embodiment. The system 100 includes a network gateway device 110, access point 120, a station 130, coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 7.

The components of the system 100 are coupled in communication over the data communication network. The components can be connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, and the like. Components can use IPv4 or IPv6 address spaces.

Figure 2:
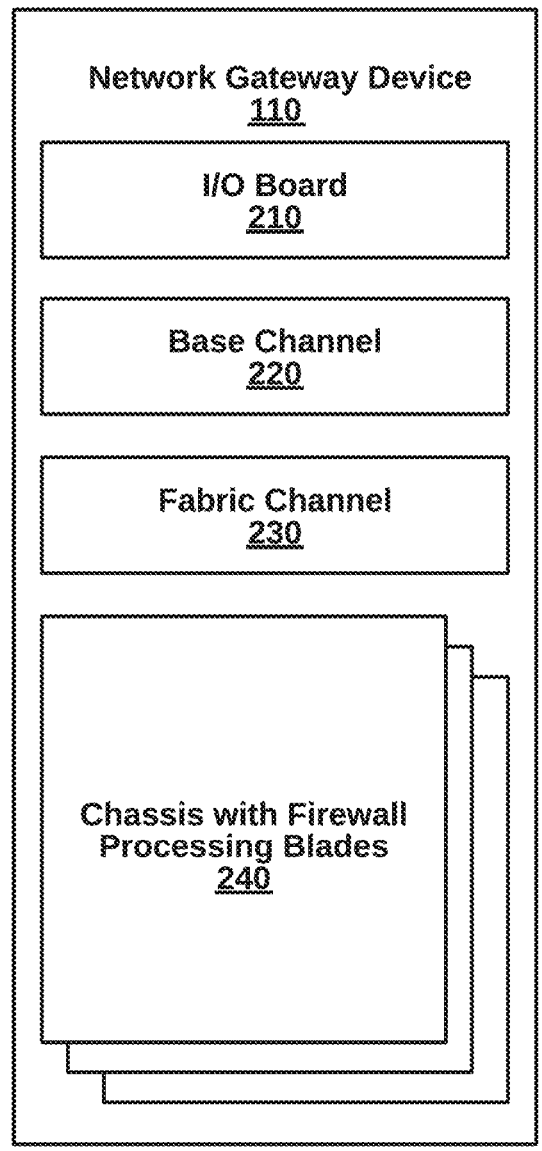
FIG. 2 is a more detailed block diagram illustrating a network gateway device of the system of FIG. 1, according to an embodiment.
Figure 3A:
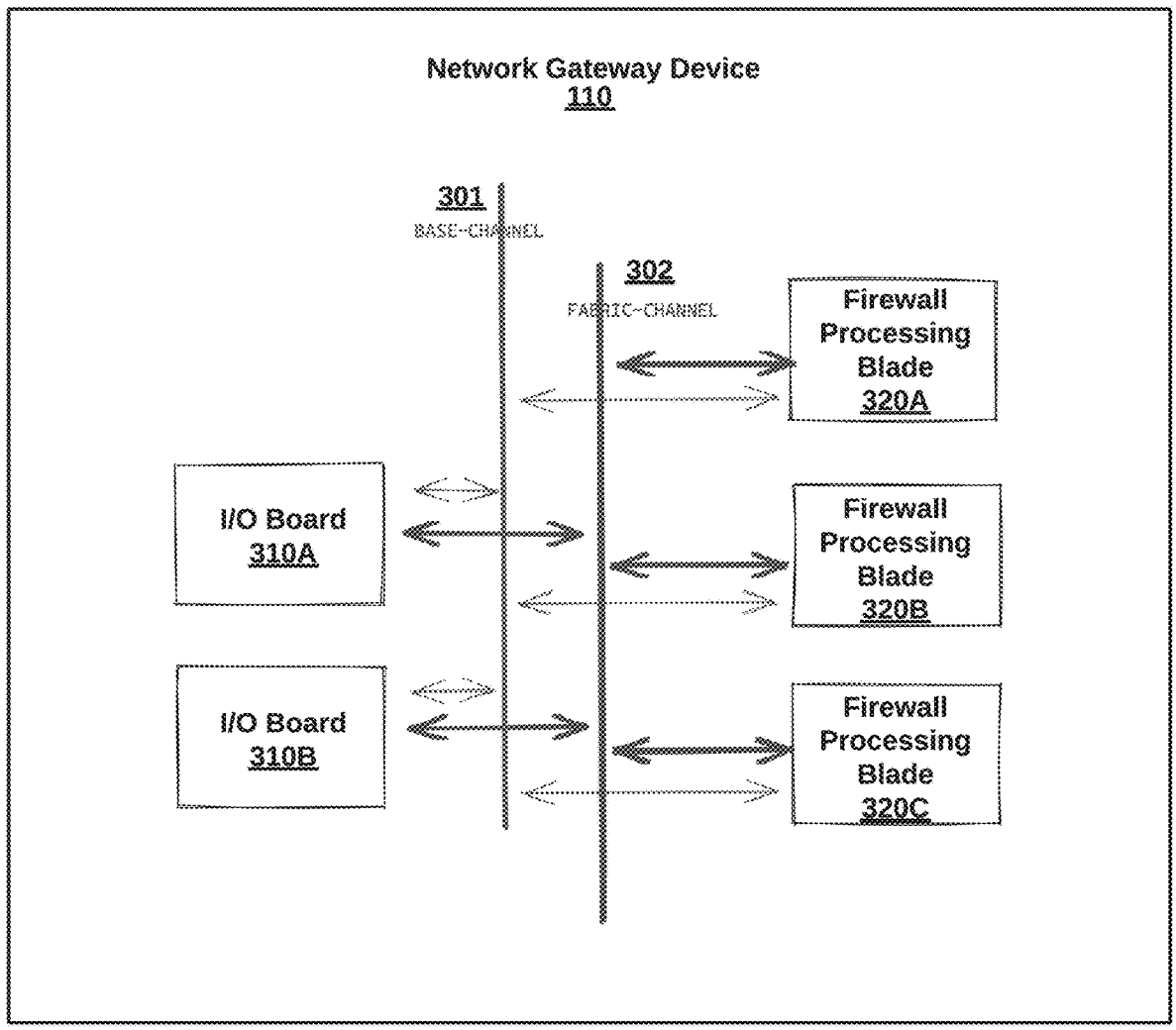
FIGS. 3A-3E are more detailed block diagram illustrating of a processing engine blade chassis of the network gateway device of FIG. 2, according to an embodiment.
Figure 3B:
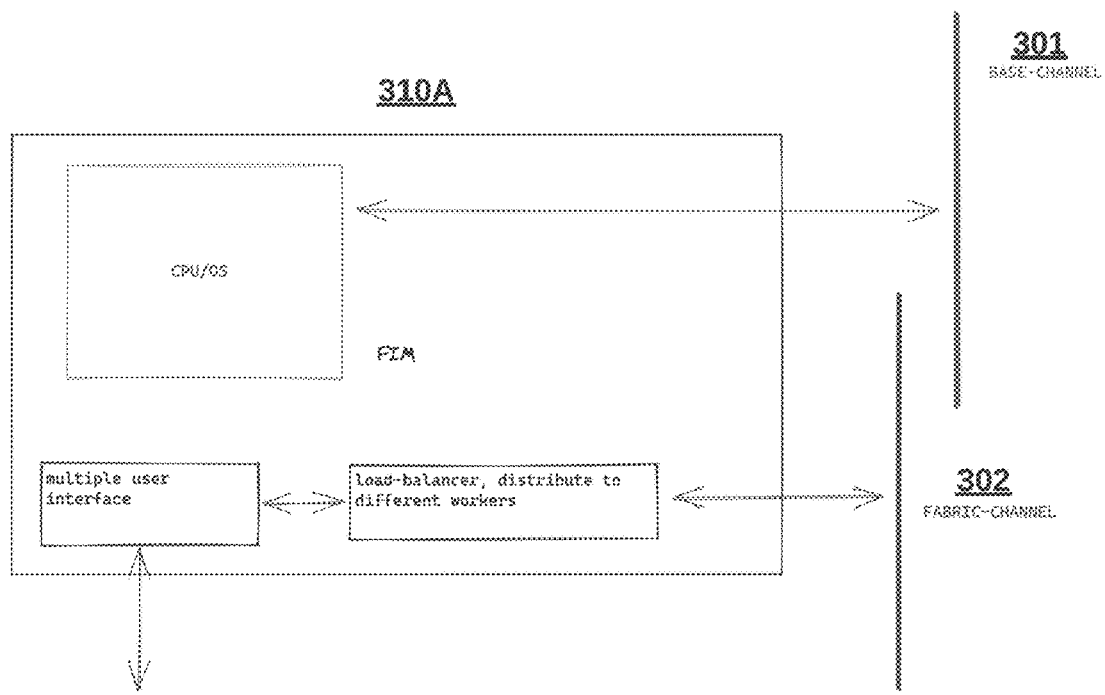
Figure 3C:
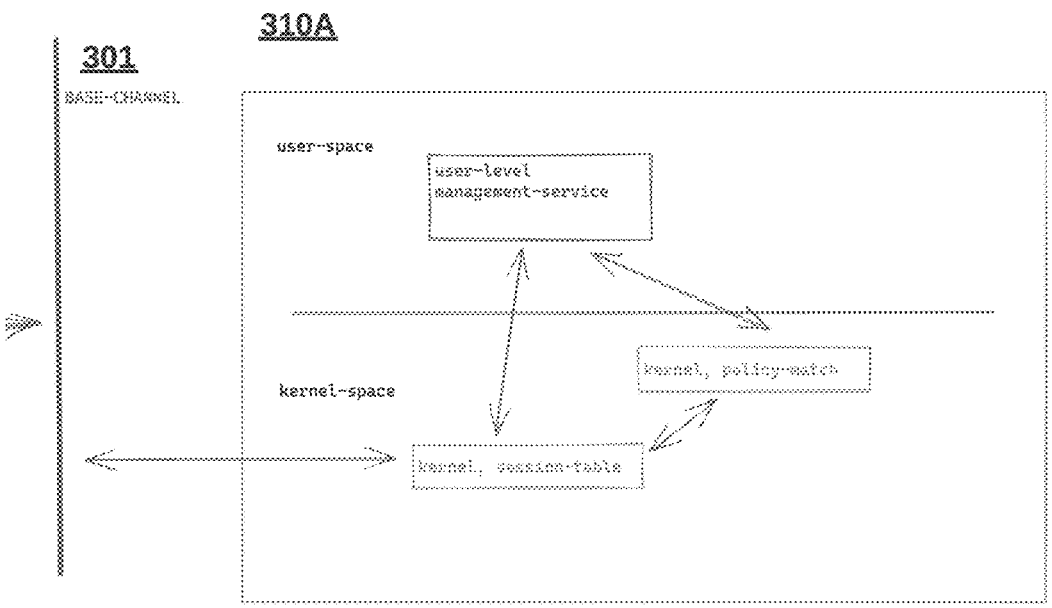
Figure 3D:
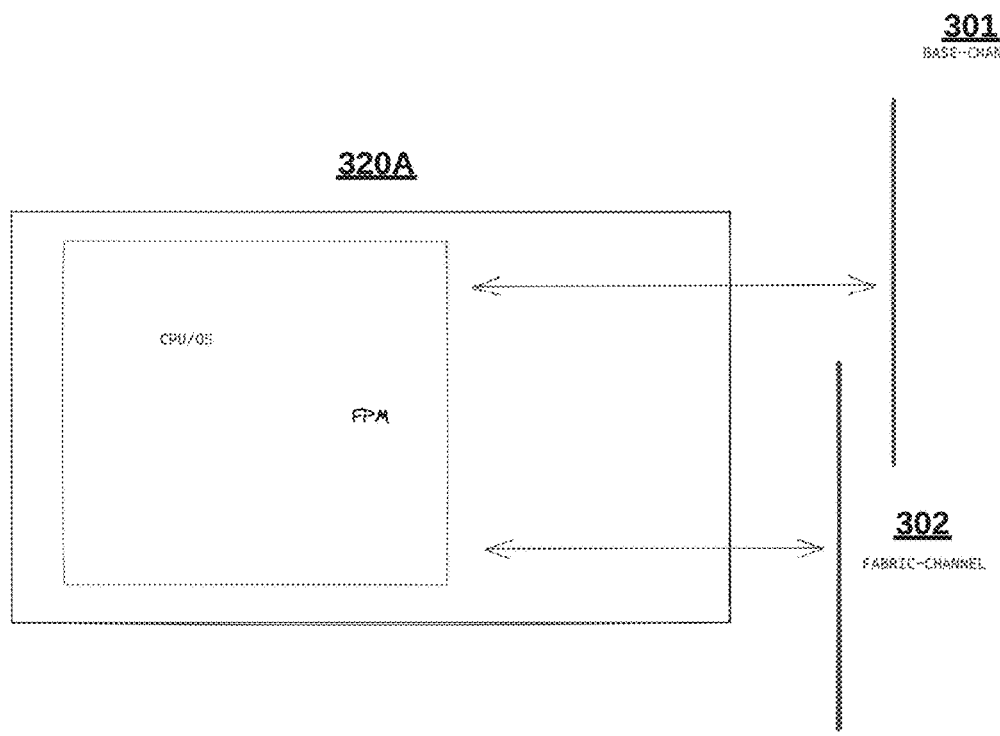
Figure 3E:
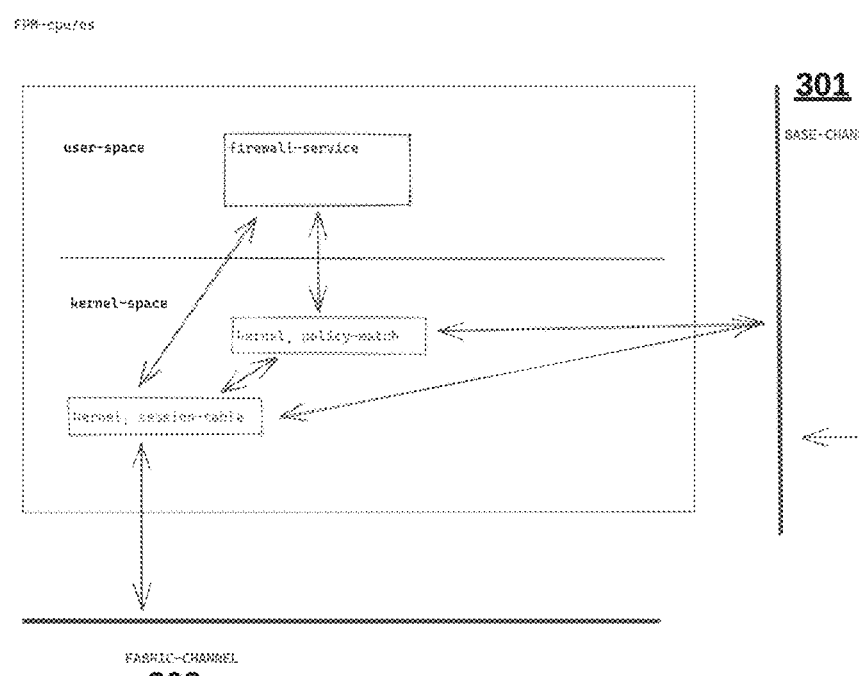

The network gateway device 110 assigns a processing blade of multiple processing blades to handle data traffic for a specific session. Selection of a particular blade utilizes session-aware load balancing to distribute data traffic over a group of processing blades (e.g., as shown in FIG. 2). A session table and an IP routing table are set up prior to encryption for outbound traffic for managing subsequent data packets from the same sessions by tracking a remote gateway address for an IPsec tunnel for each session. Outbound packet data is formatted in cleartext, meaning that no encryption has been applied. Inbound packet data is formatted in cyphertext, after being encrypted with an IPsec key for transmission over the data communication network 199. In an embodiment, the network gateway device 110 can be a high throughput device. The multiple processing blades in one case performs as well as multiple, individual gateway devices. Each of the processing blades operate mainly as an independent gateway. Another embodiment applies additional network policies on the data packets prior to forwarding. Additional details about the multiple processing blades 240 of the network gateway device 110 are provided below with respect to FIG. 2.

In general, chassis with multiple, independent, processing blades can includes several ports which connects to the processor and physically plug in processing blades. The port can be electrical contact teeth, a plug, or the like. Each of the processing blades includes a local processor, an encryption engine, and a decryption engine, and a deep packet inspector, preferably on a single physical chip or single physical board. Each blade can set up an IPsec tunnel for an assigned session. The multiple blades can be treated as a cluster when interfacing with other devices. In one embodiment, all traffic for a session or other instance is processed by the same blade, and sessions are load balanced between the blades.

When an outbound data packet requires IPsec protection, a blade on the chassis checks for SAs to set up an IPsec tunnel. If SAs are not cached, a request is sent to the processor (and IKE control engine 310 below) to set up a new IPsec tunnel. Once the new SAs are returned, the processor can forward them to the initiating blade to set up. In turn, IPsec parameters are stored in the IPsec table for subsequent set up.

The access point 120 manages the station 130. An access point broadcasts beacon frames to indicate presence of wireless SSID service availability. Stations send a connection request to start an authentication and association process. Once connected wirelessly, data packets are passed to gateways for processing to destinations out of a private network. Some of the communications require VPN or a different IPsec application.

FIG. 2 is a more detailed block diagram illustrating a network gateway device 110 of the system 100 of FIG. 1, according to an embodiment. The network gateway device 110 includes an I/O board 210, a base channel 220, a fabric channel 230, and a chassis with multiple processing blades 240. The modules can be implemented in source code stored in non-transitory memory executed by a processor. Alternatively, the modules can be implemented in hardware with microcode. The modules can be singular or representative of functionality spread over multiple components. Many other variations are possible. FIGS. 3A-3E are more detailed block diagram illustrating of a processing engine blade chassis of the network gateway device of FIG. 2, according to an embodiment.

The I/O board 210 or 310A, 310B, can have a user interface and a load balancing engine, coupled to the base channel 220 on a chassis internal switch for chassis management and coupled to the fabric channel 230 on a chassis internal switch for user data traffic. The I/O board 210 receives a data packet from the user interface.

The plurality of firewall processing blades 240 or 320A-C each has a local processor, each firewall processing card coupled to the base channel 220 or 301 and coupled to the fabric channel 230 or 302. The load balancing engine selects a firewall processing blade to send the data packet over the fabric channel. The firewall processing card selected by the load balancing engine receives the data packet over the fabric channel and, checks for a session matching to the data packet. If the session match exists to management-type data packets the data packet is returned to the I/O board 210 and if a match exists to user data packets the data packet is sent to a firewall service of the firewall processing card. If no session match exists, the firewall processing card checks for a policy match to the data packet for creating a new session, and if no policy match exists, drops the data packet.

The I/O board 210 can then receive the data packet returned from the processing blade over the base channel and checks for a session matching to the data packet. If a session match exists and the data packet is a management data packet, the data packet is sent to a management service at a user level of the I/O board and if not a management data packet the data packet is dropped, and if no session match exists, the I/O board checks for a policy match to the data packet for creating a new session, and if no policy match exists, drops the data packet.

Figure 5:
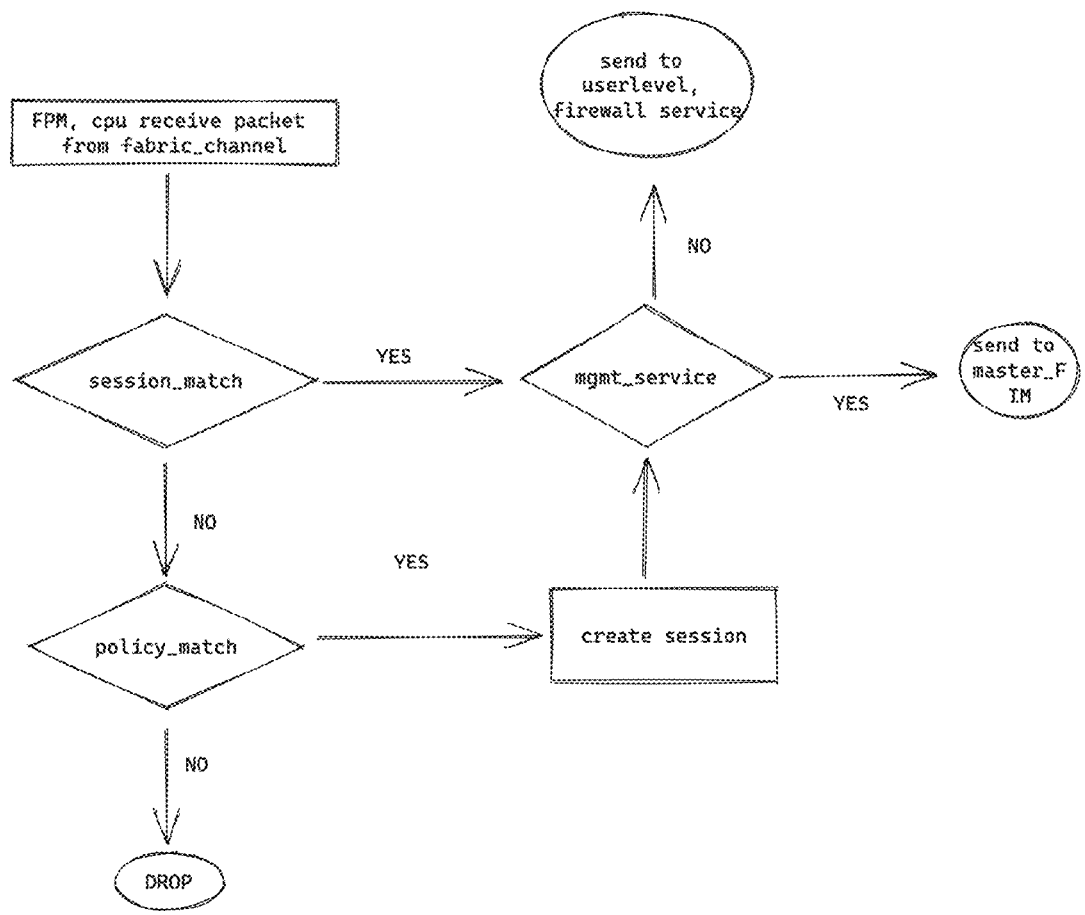
FIG. 5 is a more detailed flow diagram illustrating a step of processing data packets at the firewall processing blades for the method of FIG. 4, according to one embodiment.
Figure 6:
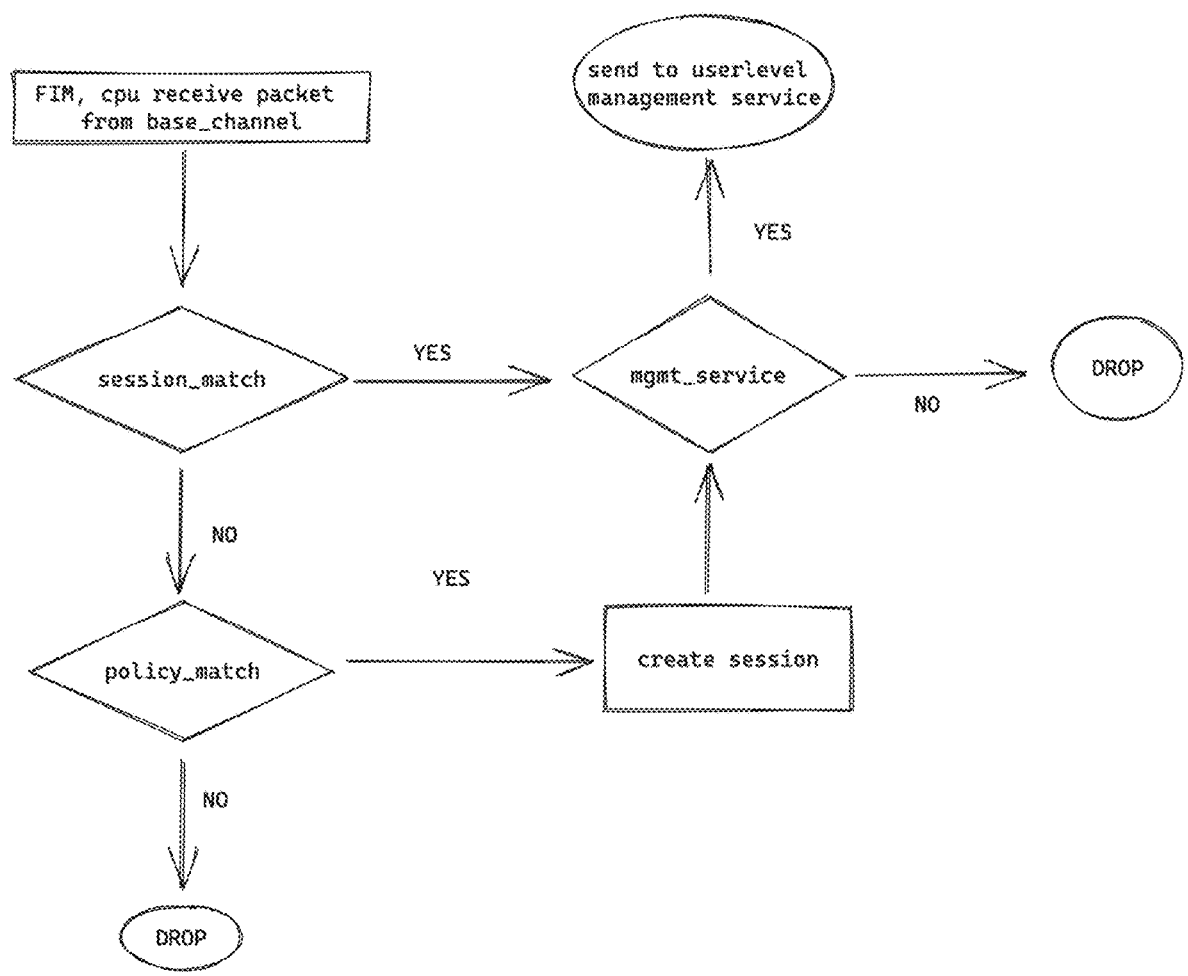
FIG. 6 is a more detailed flow diagram illustrating a step of processing data packets at the I/O board, for the method of FIG. 4, according to one embodiment.

II. Methods for Managing Firewall Processing Blades (FIGS. 4-6)

Figure 4:
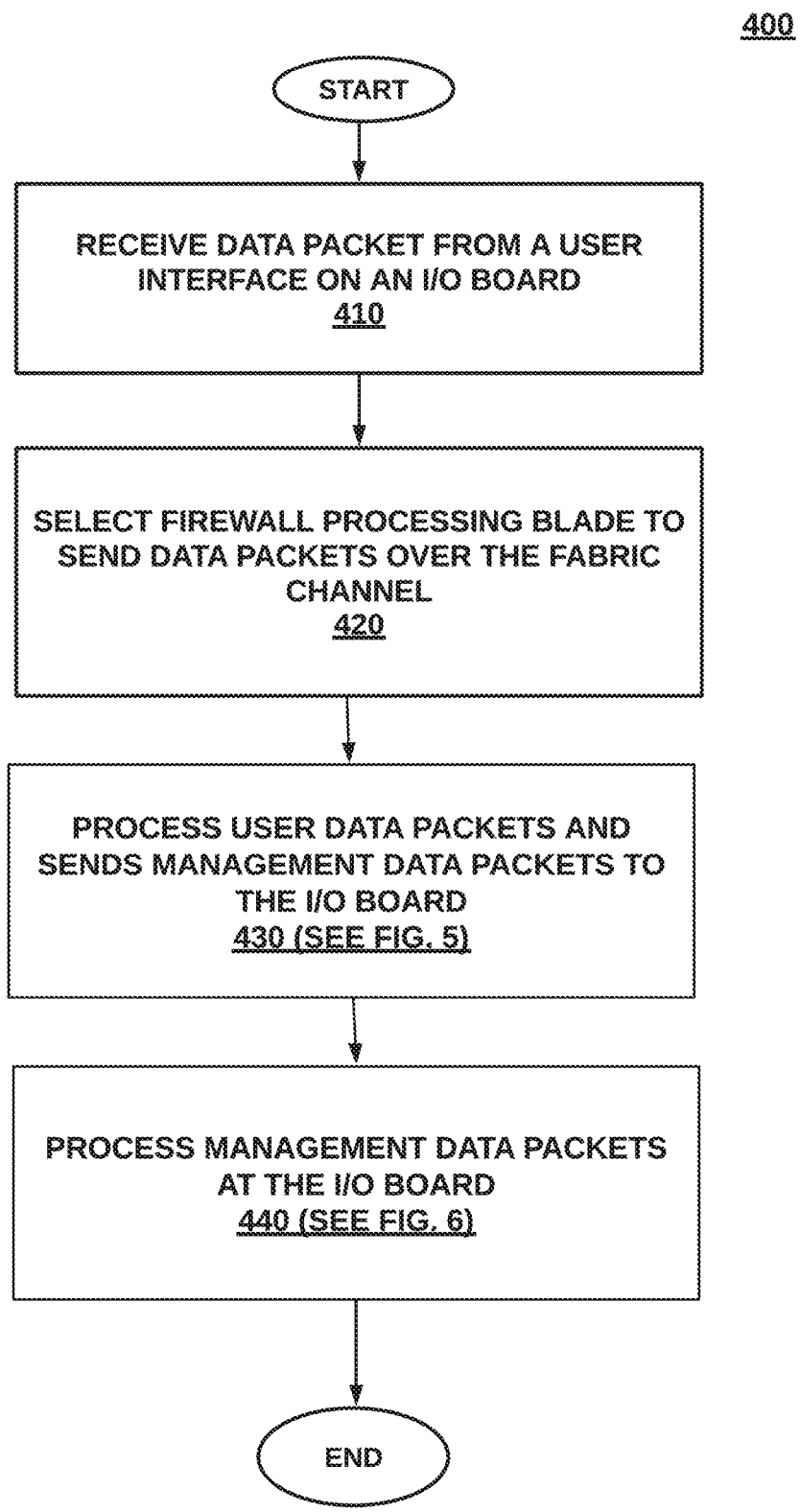
FIG. 4 is a high-level flow diagram illustrating a method for managing a group of firewall processing blades, communicatively connected over a chassis on a network device, through data paths, according to one preferred embodiment.

FIG. 4 is a high-level flow diagram illustrating a method 400 for managing a group of firewall processing blades, communicatively connected over a chassis on a network device, through data paths, through data paths, according to one preferred embodiment. The method 400 can be implemented, for example, by the network gateway device 110 of system 100. The steps are merely representative groupings of functionality, as there can be more or fewer steps, and the steps can be performed in different orders. Many other variations of the method 400 are possible.

At step 410, a data packet is received from a user interface on an I/O board having a user interface and a load balancing engine. The I/O board is coupled to a base channel on a chassis internal switch for chassis management.

At step 420, a firewall processing blade is selected to send the data packet over the fabric channel a plurality of firewall processing blades having a local processor. Each firewall processing card can be coupled to the base channel and also can be coupled to a fabric channel on a chassis internal switch for user data traffic.

At step 430, the firewall processing blade processes user data packets and sends management data packets to an I/O board for processing. One example of step 430 is shown in detail in FIG. 5. Additionally, at step 440, the I/O board processes the management data packets. One example of step 440 is shown in detail in FIG. 6.

In more detail, with reference to FIG. 5, the data packet is received from a user interface on an I/O board. A session match is checked for the data packet. If a session match exists to management data packets the data packet is returned to the I/O board and if a match exists to user data packets the data packet is sent to a firewall service of the firewall processing card. If no session match exists, a new session is created if a policy match exists. The data packet is dropped if there is no policy match.

Turning to FIG. 6, the data packet is received at the I/O board returned over the base channel. A session match is checked for the data packet. If a session match exists and the data packet is a management data packet, the data packet is sent to a management service at a user level of the I/O board and if not a management data, the data packet is dropped. If no session match exists, the I/O board checks for a policy match to the data packet for creating a new session. If no policy match exists, the data packet is dropped.

III. Generic Computing Environment (FIG. 7)

Figure 7:
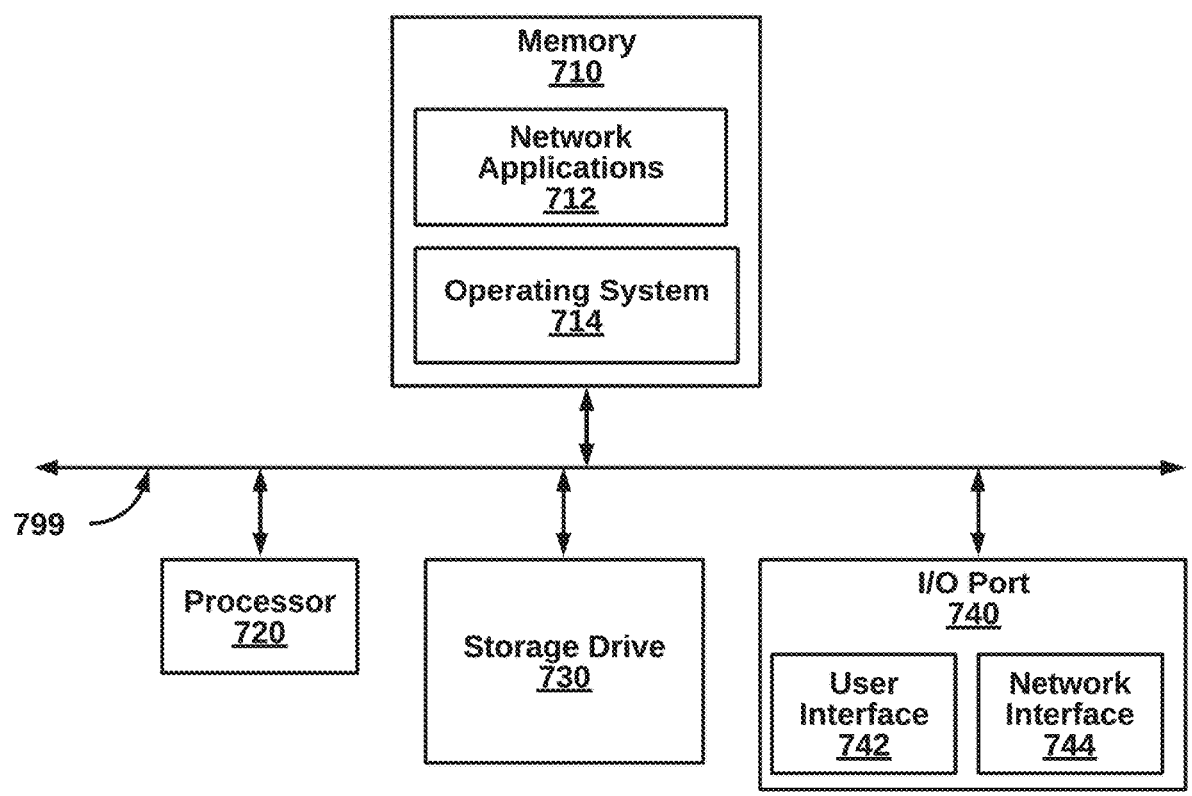
FIG. 7 is a high-level block diagram illustrating a computing device as an example hardware implementation of network devices herein, according to an embodiment.

FIG. 7 is a block diagram illustrating a computing device 700 capable of implementing components of the system, according to an embodiment. The computing device 700 of the present embodiment, includes a memory 710, a processor 720, a storage drive 730, and an I/O port 740. Each of the components is coupled for electronic communication via a bus 799. Communication can be digital and/or analog and use any suitable protocol. The computing device 700 can be any of components of the system 100 (e.g., the local network gateway device 110A, the remote network gateway device 110B, the local access point 120A, the remote access point 120B, the local station 130A, and the remote station 130B), other networking devices (e.g., an access point, a firewall device, a gateway, a router, or a wireless station), or a disconnected device.

Network applications 712 (e.g., the load balancing engine 112) can be network browsers, daemons communicating with other network devices, network protocol software, and the like. An operating system 714 within the computing device 700 executes software, processes. Standard components of the real OS environment 714 include an API module, a process list, a hardware information module, a firmware information module, and a file system. The operating system 714 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows version 6, 8 or 10), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 730 can be any non-volatile type of storage such as a magnetic disc, EEPROM (electronically erasable programmable read-only memory), Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IPsec, Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A network gateway device having multiple firewall processing blades coupled over a chassis system, for managing the chassis system through data paths, the network gateway device comprising:
    an I/O board having a user interface and a load balancing engine, coupled to a base channel on a chassis internal switch for chassis management and coupled to a fabric channel on a chassis internal switch for user data traffic, the I/O board to receive a data packet from the user interface; and
    a plurality of firewall processing blades having a local processor, each firewall processing card coupled to the base channel and coupled to the fabric channel, wherein the load balancing engine selects a firewall processing blade to send the data packet over the fabric channel;
    wherein the firewall processing card selected by the load balancing engine receives the data packet over the fabric channel and, checks for a session matching to the data packet, if the session match exists to management-type data packets the data packet is returned to the I/O board and if a match exists to user data packets the data packet is sent to a firewall service of the firewall processing card, and if no session match exists, the firewall processing card checks for a policy match to the data packet for creating a new session, and if no policy match exists, drops the data packet, and
    wherein the I/O board receives the data packet returned from the processing blade over the base channel and checks for a session matching to the data packet, if a session match exists and the data packet is a management data packet, the data packet is sent to a management service at a user level of the I/O board and if not a management data packet the data packet is dropped, and if no session match exists, the I/O board checks for a policy match to the data packet for creating a new session, and if no policy match exists, drops the data packet.

2. The network gateway device of claim 1, wherein the processing blade receives the data packet into a kernel space of an operating system, and the firewall service executes in a user space of the operating system.

3. The gateway device of claim 1, wherein the I/O board receives the data packet into a kernel space of an operating system, and the management service executes in a user space of the operating system.

4. The gateway device of claim 1, further comprising a second I/O board, wherein the I/O board is a controller I/O board.

5. A method in local network gateway device having multiple processing blades coupled to a data communication network with a remote network gateway device and a local network with a plurality of stations, for preventing key failure in BSS (Basic Service Set) fast transition of a station attempting to connect from a source access point managed by a Wi-Fi controller to the target access point also managed by the Wi-Fi controller, the method comprising the steps of:
    receiving a data packet from a user interface on an I/O board having a user interface and a load balancing engine, coupled to a base channel on a chassis internal switch for chassis management;
    selecting a firewall processing blade to send the data packet over the fabric channel a plurality of firewall processing blades having a local processor, each firewall processing card coupled to the base channel and coupled to a fabric channel on a chassis internal switch for user data traffic;
    receiving the data packet at the firewall processing blade over the fabric channel, and:
        checking for a session matching to the data packet, if a match exists to management data packets the data packet is returned to the I/O board and if a match exists to user data packets the data packet is sent to a firewall service of the firewall processing card,
        if no session match exists, checking for a policy match to the data packet for creating a new session, and
        if no policy match exists, dropping the data packet; and
    receiving the data packet at the I/O board returned over the base channel, and:
        checking for a session matching to the data packet, if a session match exists and the data packet is a management data packet, the data packet is sent to a management service at a user level of the I/O board and if not a management data, dropping the data packet,
        if no session match exists, the I/O board checks for a policy match to the data packet for creating a new session, and
        if no policy match exists, dropping the data packet.

6. A method in a non-transitory computer-readable media in local network gateway device having multiple processing blades coupled to a data communication network with a remote network gateway device and a local network with a plurality of stations, the method for preventing key failure in BSS (Basic Service Set) fast transition of a station attempting to connect from a source access point managed by a Wi-Fi controller to the target access point also managed by the Wi-Fi controller, the method comprising the steps of:

receiving a data packet from a user interface on an I/O board having a user interface and a load balancing engine, coupled to a base channel on a chassis internal switch for chassis management;

selecting a firewall processing blade to send the data packet over the fabric channel a plurality of firewall processing blades having a local processor, each firewall processing card coupled to the base channel and coupled to a fabric channel on a chassis internal switch for user data traffic;

receiving the data packet at the firewall processing blade over the fabric channel, and:

checking for a session matching to the data packet, if a match exists to management data packets the data packet is returned to the I/O board and if a match exists to user data packets the data packet is sent to a firewall service of the firewall processing card, if no session match exists, checking for a policy match to the data packet for creating a new session, and if no policy match exists, dropping the data packet; and receiving the data packet at the I/O board returned over the base channel, and:

checking for a session matching to the data packet, if a session match exists and the data packet is a management data packet, the data packet is sent to a management service at a user level of the I/O board and if not a management data, dropping the data packet, if no session match exists, the I/O board checks for a policy match to the data packet for creating a new session, and if no policy match exists, dropping the data packet.

* * * * *